Figure 1:
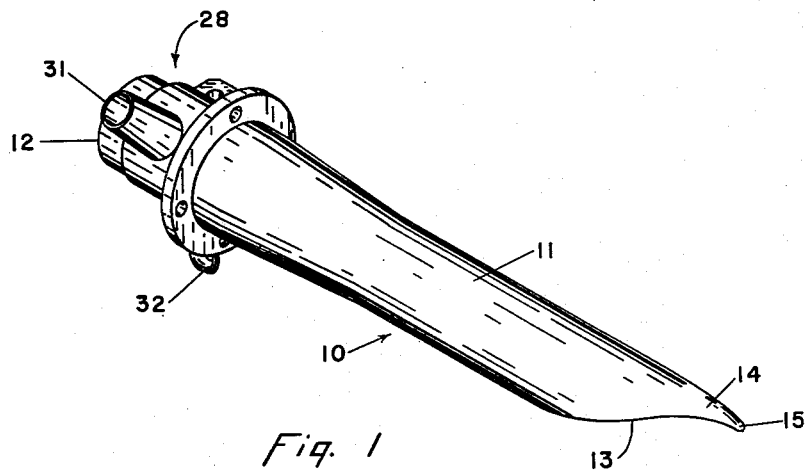

July 6, 1965

H. V. WHITE, JR., ETAL 3,192,967

BAG FILLING DEVICES

Filed July 2, 1962

2 Sheets-Sheet 1

INVENTORS
HERBERT V. WHITE, Jr.
JAMES H. WETSEL

BY Brown & Rosen

United States Patent Office 3,192,967
Patented July 6, 1965

3,192,967
BAG FILLING DEVICES
Herbert V. White, Jr., and James H. Wetsel, Borger, Tex., assignors to J. M. Huber Corporation, Locust, N.J., a corporation of New Jersey
Filed July 2, 1962, Ser. No. 207,126
4 Claims. (Cl. 141—67)

The present invention relates to a bag filling device, more particularly, to a bag filling tube used with a bag filling and handling machine.

The present invention is an improvement on the filling tube used in Patent No. 2,996,858 issued to Armound R. Swenson on August 22, 1961. The filling tube of the present invention can be used with the apparatus illustrated in Patent No. 2,996,858 or with other apparatuses known in the art.

The bag filling and handling machine of Patent No. 2,996,858 has a bag filling station, a weight checking station, and a discharge station. The filling station includes a horizontally extending filling tube adapted to extend into a horizontally disposed filling opening in the top of the bag to be filled. A bag holding or clamping means is provided for holding the bag against the filling tube so that the bag is suspended therefrom. The filling tube is carried by a suitable weighing means, preferably by the end of a balancing beam, which weighing means includes a control switch which is opened and closed when the bag carried by the filling tube reaches a predetermined weight to terminate the bag filling operation. Next, a bag is discharged from the filling tube and conveyed automatically to the weight checking station.

The bag handling machine is arranged so that a number of operations may be carried on simultaneously. Thus, as a given bag reaches the weight checking station, a finished bag limit switch is tripped which enables a new filling cycle to begin upon the application of a new bag to the filling tube. As the latter bag is being filled, the operator performs suitable checking operations at the checking station, such as checking the weight of the bag on the weighing scale. Preferably, the platform of the weighing scale is included and a gate or stop shoulder is provided at the bottom thereof which prevents the movement of the bag by force of gravity from the weighing scale platform. A fixed time interval after the initiation of a filling cycle, which interval is sufficient to enable an operator to perform the necessary checking operations but which is less than the time in which it takes to fill a bag, the above-mentioned gate at the bottom of the weighing scale platform is automatically lowered so that the bag thereon is carried by force of gravity to the discharge station. The bag which was previously at the discharge station must be discharged before the last-mentioned bag at the checking station is conveyed thereto. Accordingly, bag discharging means is provided at the discharge station which is timed with the beginning of the filling cycle to discharge the bag thereat before the next bag is conveyed thereto. In some intances, the discharge station includes a bag sealing means for automatically sealing the bags thereat.

Heretofore, particularly in the packaging of carbon black, the bags had a filling opening defined by a tuck-in sleeve which is tucked in by the operator of the machine after the bag is filled. Perfect closure of such bags was not possible with this type of bag so that during the handling of the bags in transit to the ultimate user, some of the pulverant material therein often escaped in the form of fine dust through the limited opening of the bag. Another type of bag used with such machines is an insert-sleeve bag which is sealed by collapsing after the filling of the bag. In either case, it is highly important that the tuck-in sleeve or the insert sleeve be cleared of powder following the filling of the bag to permit proper sealing of the sleeve and the bag.

In the Swenson bag filling and handling machine, only the insert-sleeve-type bag is usable whereas with applicants' invention applied to the Swenson machine, both the tuck-in sleeve bags and the insert-sleeve bags may be used.

The primary object of the invention is to provide a filling tube for bag filling machines which will cause a more effective sealing of the bag.

Another object of the invention is to provide a filling tube for bag filling machines which will reduce spillage and wastes of the material with which the bag is being filled.

A still further object of the invention is to provide a filling tube for a bag filling machine which will assist in the elimination of air trapped in the bag during the filling operation.

Figure 2:
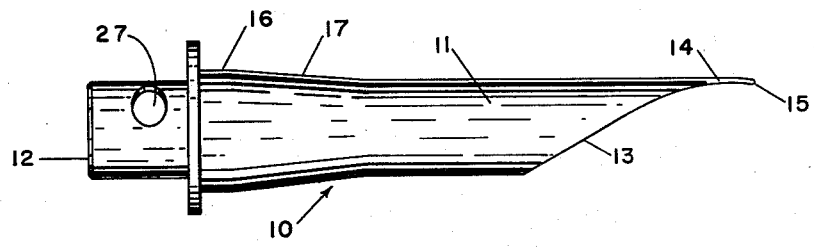
Figures 3, 4:
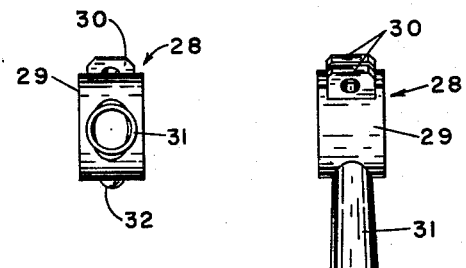
Figure 5:
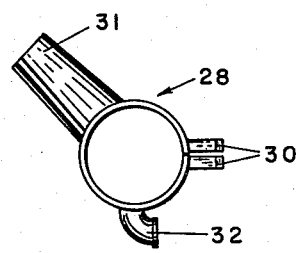
Figure 6:
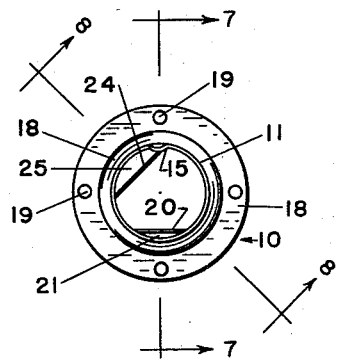
Figure 7:
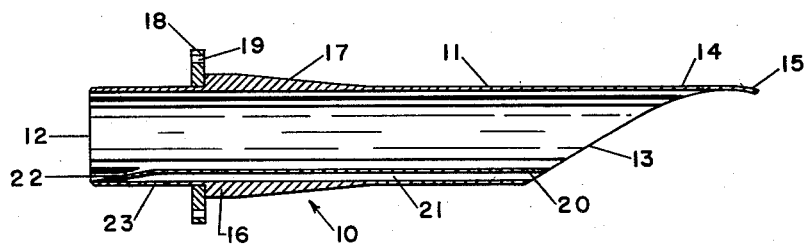
Figure 8:
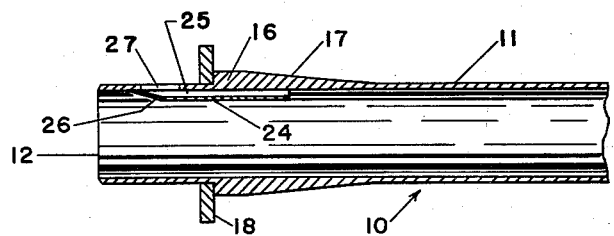

Other objects and advantages will become apparent from the following specification when considered in light of the attached drawings in which:

FIGURE 1 is a perspective view of the invention;
FIGURE 2 is a side elevation of the invention;
FIGURE 3 is a side elevation of the connector ring;
FIGURE 4 is a plan view of the connector ring;
FIGURE 5 is an end elevation of the connector ring;
FIGURE 6 is an end elevation of the invention;
FIGURE 7 is a longitudinal sectional view taken along the line 7—7 of FIGURE 6, looking in the direction of the arrows; and
FIGURE 8 is a longitudinal sectional view taken along the line 8—8 of FIGURE 6, looking in the direction of the arrows.

Referring now to the drawings in detail wherein like reference characters indicate like parts throughout the several figures, the reference numeral 10 indicates generally a filling tube constructed in accordance with the invention.

The filling tube 10 comprises a relatively thin walled elongated body 11 of circular cross section. The body 11 has its inner end 12 open and the outer end 13 is also open but sloping downwardly and inwardly to form a guide point 14 at its upper outer end. The tip 15 of the guide point 14 is bent slightly downwardly as can be seen in FIGURES 2, 6, and 7.

The body 11 is provided with a thickened wall portion 16 intermediate the opposite ends 12, 13 thereof. The thickened portion 16 tapers inwardly toward the end 13 at 17. The thickened portion 16 may be integrally formed with the body 11 or may be positioned thereon and secured thereto as a separate piece. An annular flange 18 is secured on the body 11 between the thickened portion 16 and the end 12 in contact with the thickened portion 16. The flange 18 has a plurality of bolt holes 19 formed therein for securing the filler tube 10 to a bag filling machine.

A relatively flat wall 20 is secured within the body 11 at the bottom portion thereof and defines a longitudinally extending conduit 21 arranged along the bottom of the body 11. A sloping wall 22 seals the conduit 21 adjacent the end 12 of the body 11. A port 23 extends through the body 11 adjacent the end 12 in communication with the conduit 21. The conduit 21 extends from the port 23 to the end 13 of the body 11 as can be best seen in FIGURE 7.

A relatively flat wall 24 is secured within the body 11 extending longitudinally thereof and defining a conduit 25. The wall 24 is sealed to the body 11 by a tapering wall 26 adjacent the end 12 of the body 11. The wall 24 and the conduit 25 terminates intermediate the ends of the body 11 within the thickened portion 16 thereof. The wall 24 is arranged in the upper portion of the body 11 lying in a plane at approximately 45° to the plane of the wall 20 as can be best seen in FIGURE 6. A port 27 extends through the body 11 between the end 12 and the flange 18 communicating with the conduit 25.

A connector ring indicated generally at 28 is adapted to be positioned on the body 11 between the flange 18 and the end 12 thereof overlying the ports 23 and 27. The connector ring 28 includes a generally circular split band 29 having a pair of clamping ears 30 extending outwardly therefrom on opposite sides of the split in the band 29. A nipple 31 is secured to the band 29 and is arranged to communicate with the port 27 when the connector rings 28 is clamped on the body 11. A second nipple 32 is also secured to the band 29 and communicates with the port 23 in the body 11 when the connector ring 28 is secured to the body 11.

In the use and operation of the invention, the filler tube 10 is mounted in the bag filling and handling machine of Patent No. 2,996,858 or similar machine in place of the filling tube 12 thereof. The nipple 31 is connected to a source of vacuum by a coduit (not shown) and the nipple 32 is connected by a conduit (not shown) to an exhaust system. The open end 12 of the body 11 is connected by a conduit (not shown) to a hopper containing the powdered material with which bags are to be filled.

In filling bags utilizing the filling tube 10 of the present invention, either the tuck-in sleeve or the insert sleeve of the bag to be filled is positioned over the filling tube 10 with the tapered portion 17 of the thickened portion 16 assisting in sealing the open end of the sleeve. With the bag in this position powdered material is blown through the body 11 into the bag with the air from the bag escaping through the conduit 21 and nipple 32. When sufficient powdered material has been blown into the bag to actuate the automatic cutoff due to the weight of the bag, powdered material ceases to flow into the bag. At this time, a means actuated by the cutoff device pushes the filled bag from the filling tube 10 and simultaneously vacuum through the conduit 25 evacuates the powdered material from the sleeve of the bag and from the body 11 to prevent spillage from the body 11 and to make it easier for the sleeve to be sealed. In the case of the tuck-in sleeve, the absence of material in the sleeve makes it possible for a tighter fold to be made in the sleeve. In the case of the insert sleeve the removal of the material from the sleeve by vacuum will actually assist in causing the collapse of the sleeve and the ultimate sealing thereof.

When filling bags with filling tubes, the powdered material and air create a turbulence and air pressure within the bag. It is necessary to vent the air from the bag to permit it to be filled completely and to prevent dust from escaping from between the bag and the filling tube. Prior art devices are provided with vent tubes positioned along the top of the filling tube and such devices expel excessive amounts of powder with the vented air since the air must pass through the incoming stream of powder to reach the vent tube. With applicants' device the vent conduit 21 is positioned at the bottom of the filling tube 10 with a result that the vented air contains extremely small quantities of the powder. Filling operations with the present invention are much cleaner, more accurate and are over-all much more efficient than is possible with prior art devices.

It should be understood that numerous structural modifications and adaptations may be resorted to without departing from the scope of the appended claims.

We claim:

1. A filler tube for bag filling and handling machines comprising a horizontal tubular body having its opposite inner and outer ends open, said body having the outer open end tapered downwardly and inwardly forming a guide point on the upper portion thereof, an air vent conduit extending longitudinally of the lower portion of said body within said body in fixed relation thereto, said conduit having inner and outer ends with its outer end open and contiguous with the outer open tapered end of said body, a suction conduit extending longitudinally within said body at the upper portion thereof in fixed relation thereto, said suction conduit having a length substantially less than half the length of said air vent conduit, said suction conduit having inner and outer ends with its outer end open and terminating intermediate the inner and outer ends of said body and a connector ring detachably secured to said body communicating respectively with the inner end of said air vent conduit and the inner end of said suction conduit.

2. A device as claimed in claim 1 wherein said air vent conduit is formed by an elongated generally flat plate having its opposite side edges secured in sealed relation to the inner surface of said body.

3. A device as claimed in claim 1 wherein said suction conduit is formed by an elongated generally flat plate having its opposite side edges secured in sealed relation to the inner surface of said body.

4. A device as claimed in claim 2 wherein said suction conduit is formed by an elongated generally flat plate having its opposite side edges secured in sealed relation to the inner surface of said body.

References Cited by the Examiner

UNITED STATES PATENTS

| 867,169 | 9/07 | Thomas | 285—197 |
|---|---|---|---|
| 2,029,733 | 2/36 | McNeil | 141—68 |
| 2,412,026 | 12/46 | Adams | 141—68 |
| 3,118,474 | 1/64 | Eppolito | 141—68 |

FOREIGN PATENTS 1,164,436  5/58  France.

LAVERNE D. GEIGER, *Primary Examiner.*